United States Patent [19]

Kogane et al.

[11] Patent Number: 4,639,118

[45] Date of Patent: Jan. 27, 1987

[54] PHOTOGRAPHIC PAPER ACCOMMODATING APPARATUS

[75] Inventors: Mikio Kogane; Kenji Suzuki; Eiichi Kito; Kazufumi Kubota; Kanji Tokuda, all of Kanagawa, Japan

[73] Assignee: Fuji Photo Film Co., Ltd., Kanagawa, Japan

[21] Appl. No.: 794,030

[22] Filed: Nov. 1, 1985

[30] Foreign Application Priority Data

Nov. 1, 1984 [JP] Japan ................................ 59-230977

[51] Int. Cl.[4] ................................ G03B 29/00

[52] U.S. Cl. ................................ 355/29; 355/28

[58] Field of Search ................................ 355/28, 29

[56] References Cited

U.S. PATENT DOCUMENTS 4,429,988 2/1984 Okabe ................................ 355/29

*Primary Examiner*—Monroe H. Hayes

*Attorney, Agent, or Firm*—Sughrue, Mion, Zinn, Macpeak and Seas

[57] ABSTRACT

A photographic paper accommodating apparatus is disposed between a photographic paper printing section and a developing section so as to absorb or retain the slack in a continuous photographic paper fed from the former to the latter which occurs due to a difference between the respective processing speeds at these sections. First clamping and transporting rollers are provided on the downstream side of the printing section so as to define a first photographic paper looping area between the printing section and the first clamping and transporting rollers. Second clamping and transporting rollers are provided on the downstream side of the first clamping and transporting rollers so as to define a second photographic paper looping area between the first and second clamping and transporting rollers. A guide member is movable between a first position at which it guides the photographic paper from the printing section to the first clamping and transporting rollers and a second position at which the guide member guides the paper from the first clamping and transporting rollers to the second clamping and transporting rollers. Accordingly, when the exposure operation at the printing section is resumed after the photographic paper has been cut to suspend the operation, the trailing end portion of the cut photographic paper which has been exposed before the resumption of the operation can be accommodated in the second looping area, and the leading end portion of the following section of the paper exposed after the resumption of the operation can be accommodated in the first looping section.

22 Claims, 7 Drawing Figures

PHOTOGRAPHIC PAPER ACCOMMODATING APPARATUS

BACKGROUND OF THE INVENTION

1. Field of the Invention

The present invention relates to a photographic paper accommodating apparatus for feeding out a continuous photographic paper having been subjected to printing to a subsequent step in which the photographic paper is processed by, for example, a developer.

2. Description of the Related Art

One type of photographic printer is arranged such that a development apparatus (processor) is disposed on the downstream side of a printing section where the image of a negative film is printed on a photographic paper by exposure light, so as to continuously develop the exposed photographic paper. This type of photographic printer-processor needs a photographic paper accommodating apparatus between the printing section and the developer for the purpose of absorbing a difference between the photographic paper feed rate at the printing section and that at the developing section.

In one type of conventional photographic paper accommodating apparatus, the portion of the continuous photographic paper fed out thereto at a relatively high feed rate from the printing section is temporarily accommodated in the form of a loop, thereby allowing absorption of the feed rate difference between the printing section and the developing section where the photographic paper is processed at relatively low speed.

In this type of accommodating apparatus, when the exposure operation at the printing section is to be temporarily suspended, the intermediate portion of the continuous photographic paper is cut by means of a cutter disposed between the accommodating apparatus and the developing section, thereby allowing the portion of the photographic paper in the developing section to move freely. In this way, it is possible when resuming the exposure operation at the printing section to immediately start the operation, and the portion of the photographic paper already accommodated in the form of a loop can be successively fed out to the developing section. The accommodating apparatus has another cutter disposed between the apparatus and the printing section, so that when the printing operation is to be finished, the intermediate portion of the photographic paper is cut by this cutter, thereby allowing all of the exposed portion of the photographic paper to be developed without wastefully developing any portion of the photographic paper which need not be developed.

Accordingly, this type of conventional photographic paper accommodating apparatus needs two cutters respectively disposed between the apparatus and the developing section and between the apparatus and the printing section, which fact complicates the maintenance of the apparatus.

Further, when the photographic paper is cut by the cutter disposed between the printing section and the accommodating apparatus for the purpose of finishing the exposure operation at the printing section, it is not possible to immediately resume the operation when required for any reason, since the photographic paper cannot be fed into the accommodating apparatus until all the portion of the paper accommodated in the looping area of the apparatus has been fed to the developing section.

SUMMARY OF THE INVENTION

In view of the above-described circumstances, it is a primary object of the present invention to provide a photographic paper accommodating apparatus which has a reduced number of required cutters and enables the exposure operation at the printing section to be resumed even when it has been suspended immediately prior thereto.

To this end, the present invention provides a photographic paper accommodating apparatus comprising: first clamping and transporting rollers disposed on the downstream side of the printing section so as to clamp and transport a continuous photographic paper and define a first photographic paper looping area between the printing section and the first clamping and transporting rollers; second clamping and transporting rollers disposed on the downstream side of the first clamping and transporting rollers so as to clamp and transport the photographic paper and define a second photographic paper looping area between the first and second clamping and transporting rollers; and a guide member movable between at least two, that is, first and second, positions, at which first position the guide member is disposed between the printing section and the first clamping and transporting rollers so as to guide the leading end portion of the photographic paper to the first clamping and transporting rollers, and at which second position the guide member is disposed between the first and second clamping and transporting rollers so as to guide the leading end portion of the photographic paper to the second clamping and transporting rollers.

By virtue of the above arrangement of the present invention, when the exposure operation at the printing section is to be temporarily suspended, the intermediate portion of the photographic paper is cut by a cutter disposed between the printing section and the accommodating apparatus, thereby allowing the developing operation to be continued. When the exposure operation is to be resumed, the guide member is moved from the second position so as to open the second looping area and allow the loop of the photographic paper in the first looping area to move to the second looping area. The guide member is then moved to the first position so that the leading end portion of the photographic paper which has been cut and newly fed out is guided to the first clamping and transporting rollers. Then, the guide member is further moved from the first position so as to open the first looping area, thereby allowing the photographic paper to form a loop in the first looping area.

Accordingly, it is not necessary to provide another cutter between the accommodating apparatus and the developing section. In addition, a plurality of loops of the photographic paper are formed by enabling the conventionally disposed guide member to move between the first and second positions, thereby allowing the exposure operation at the printing section to be resumed even when it has been suspended immediately prior thereto.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote link elements, and in which.

DESCRIPTION OF THE PREFERRED EMBODIMENT

Figure 1:
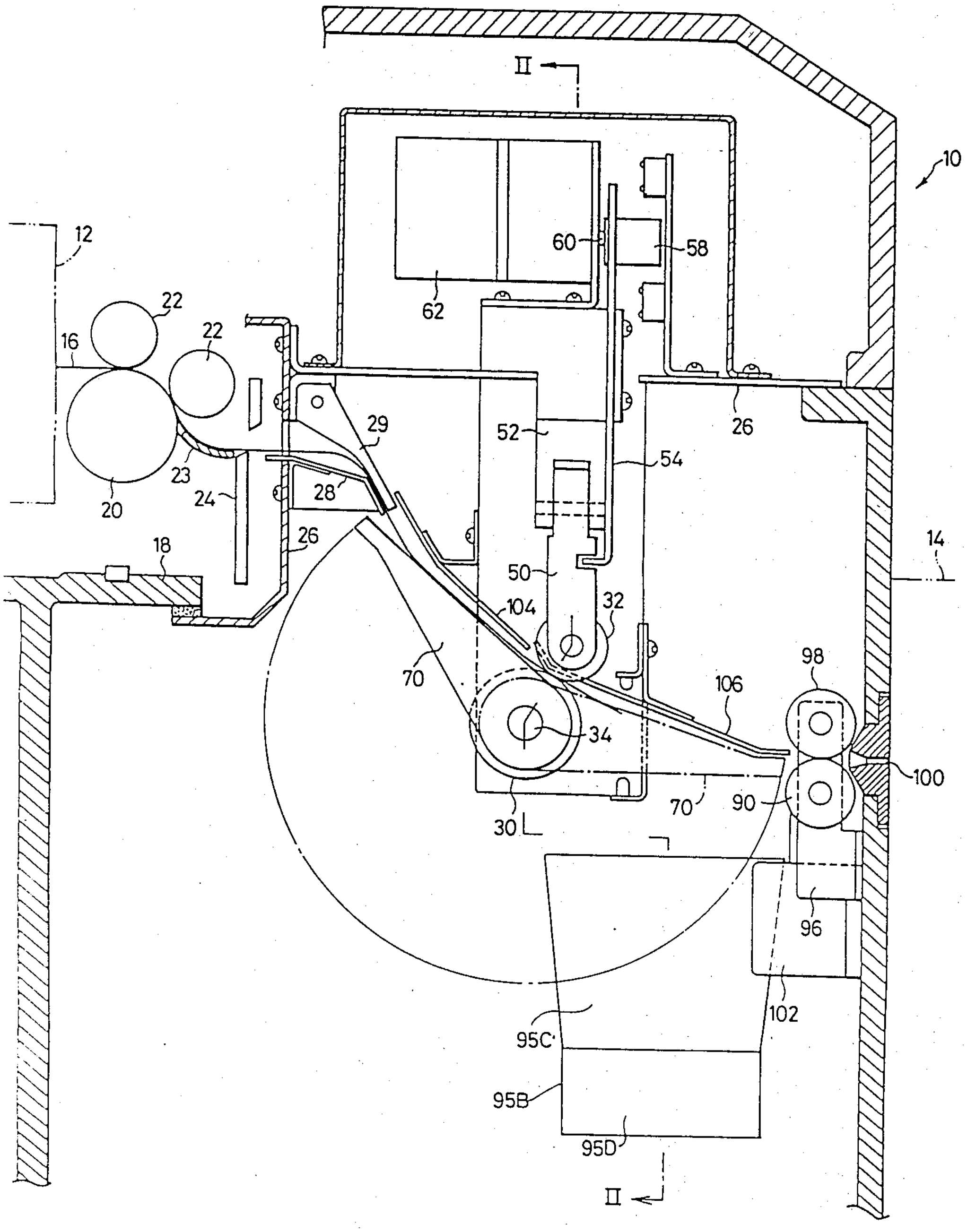
FIG. 1 is a sectional view of one embodiment of the photographic paper accommodating apparatus according to the present invention.
Figure 2:
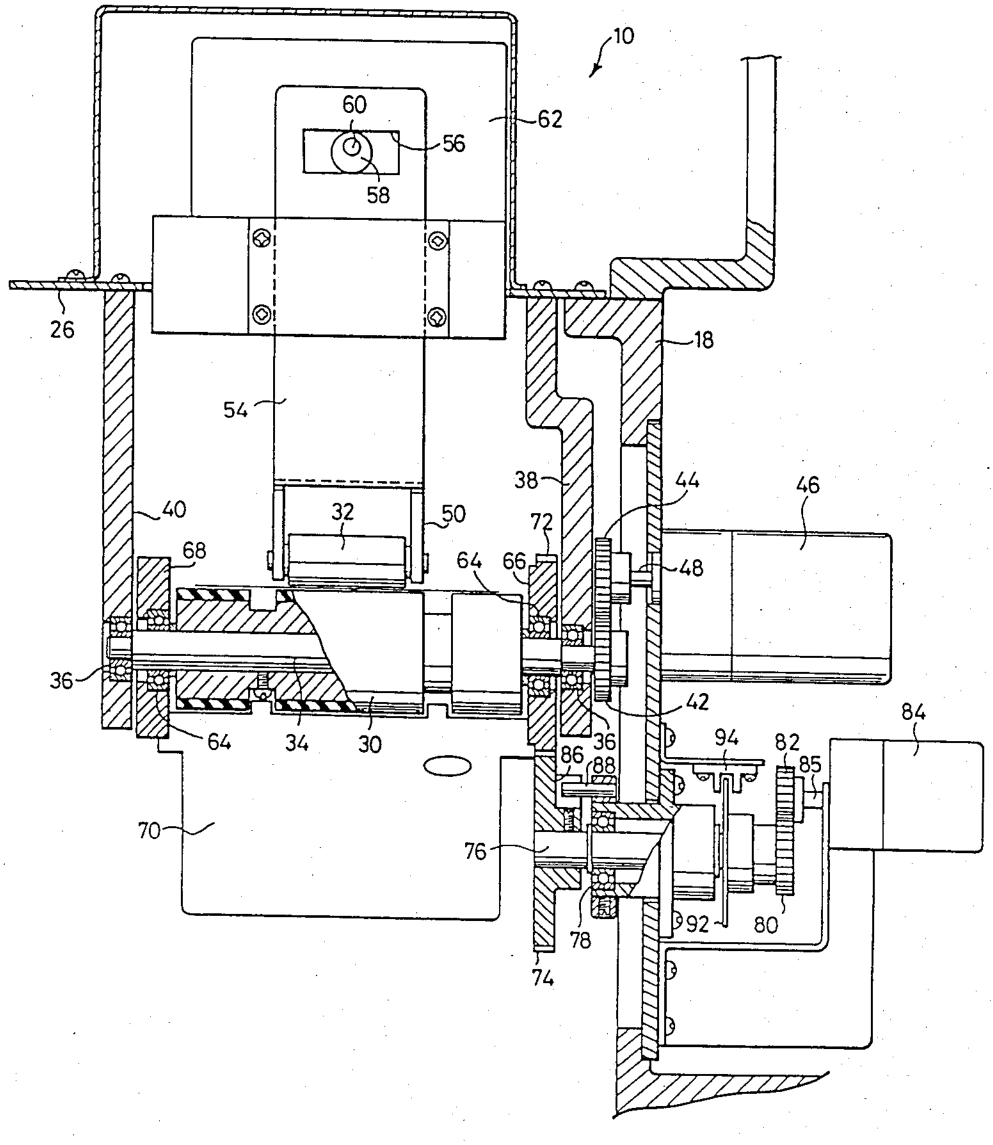
FIG. 2 is a sectional view taken along the line II—II of FIG. 1.

FIGS. 1 and 2 show a photographic paper accommodating apparatus 10 in accordance with one embodiment of the present invention. The apparatus 10 is disposed between a printing section 12 and a developing section 14 so as to guide a continuous photographic paper 16 exposed in the printing section 12 to the developing section 14.

The photographic paper accommodating apparatus 10 has a machine frame 18 which is formed integrally with the machine frame of the printing section 12. A delivery roller 20 is rotatably supported by the frame 18 on the side thereof which is closer to the printing section 12, that is, on the downstream side of the section 12. The delivery roller 20 is rotated by the driving force of a motor (not shown) so as to feed a continuous photographic paper 16 to the accommodating apparatus 10, the paper 16 being clamped between the roller 20 and a pressure roller 22 abutting against the outer periphery of the roller 20.

A guide plate 23 and a cutter 24 are provided between the delivery roller 20 and the accommodating apparatus 10, whereby the intermediate portion of the photographic paper 16 can be cut as required.

A bracket 26 is secured to the machine frame 18, and guide plates 28 and 29 are mounted on the bracket 26 so as to be positioned on the downstream side of the cutter 24. The guide plates 28 and 29 serve to feed the photographic paper 16 to the area between first clamping and transporting rollers 30 and 32. The first clamping and transporting roller 30 has a support shaft 34 integrally secured thereto. As shown in FIG. 2, the support shaft 34 has both end portions rotatably supported by bearing plates 38 and 40 through bearings 36, respectively. The bearing plates 38 and 40 are suspended from the bracket 26.

A gear 42 is secured to the distal end portion of the support shaft 34 which projects out from the bearing plate 38. The gear 42 is meshed with a gear 44 which is secured to the output shaft 48 of a motor 46 mounted on the machine frame 18. Thus, it is possible to transmit the rotational force of the motor 46 to the first clamping transporting roller 30 so as to rotate it.

The first clamping and transporting roller 32 pressed against the roller 30 is rotatably supported by a bearing plate 50. The bearing plate 50 is guided by a bracket 52 secured to the bracket 26 in such a manner that the plate 50 is movable in the direction in which the roller 32 comes in and out of contact with the roller 30. The bearing plate 50 is engaged with the lower end portion of a lifting plate 54 which has a rectangular window 56 formed in its upper end portion, as shown in FIG. 2. An eccentric cam 58 is received in the window 56. The cam 58 has an eccentric shaft 60 which is constituted by the output shaft of a motor 62 supported by the bracket 26.

Accordingly, as the motor 62 rotates, the lifting plate 54 moves vertically, thus enabling the roller 32 to come in and out of contact with the roller 30.

As shown in FIG. 2, rotary plates 66 and 68 are carried on the support shaft 34 of the first clamping and transporting roller 30 through respective bearings 64, the plates 66 and 68 being respectively disposed between the roller 30 and the bearing plate 38 and between the roller 30 and the bearing plate 40. Side edges at one end of a flap 70 which serves as a guide member are respectively secured to the rotary plates 66 and 68.

The rotary plate 66 is formed on its outer periphery with a gear 72 which is meshed with a gear 74. The shaft 76 of the gear 74 is rotatably supported by the machine frame 18 through a bearing 78. A gear 80 is secured to the distal end portion of the shaft 76 which projects out from the frame 18, and is meshed with a gear 82. The gear 82 is secured to the output shaft 85 of a motor 84 which is mounted on the frame 18. Accordingly, the flap 70 can be rotated by the driving force of the motor 84.

As shown in FIG. 2, the gear 74 has a recess 86 formed in a portion thereof, and a limit pin 88 projecting from the frame 18 extends into the recess 86 so as to limit the rotational angle of the flap 70. The rotational angle of the flap 70 ranges, as shown in FIG. 1, between a first position at which the flap 70 in stretched between the guide plate 28 and the first clamping and transporting roller 30 and a second position at which the flap 70 is stretched between the roller 30 and a second clamping and transporting roller 90. The rotational position of the flap 70 is controlled by detecting the rotational angle of a rotary plate 92 secured to the shaft 76 by means of a sensor 94, as shown in FIG. 2.

Figure 3A:
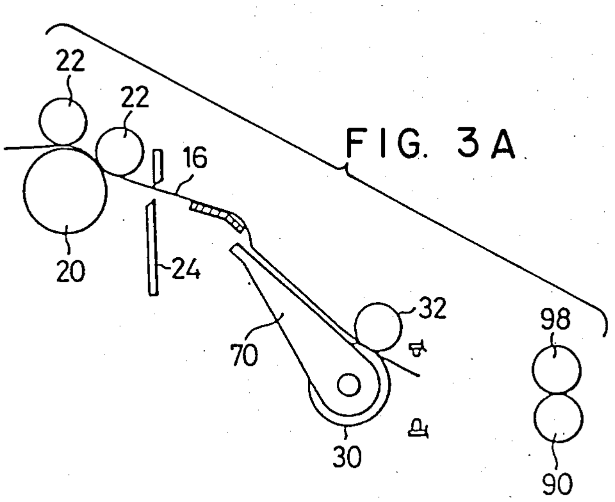
FIGS. 3(A) to 3(E) show the guide member shown in FIG. 1 in various operative states, respectively.
Figure 3B:
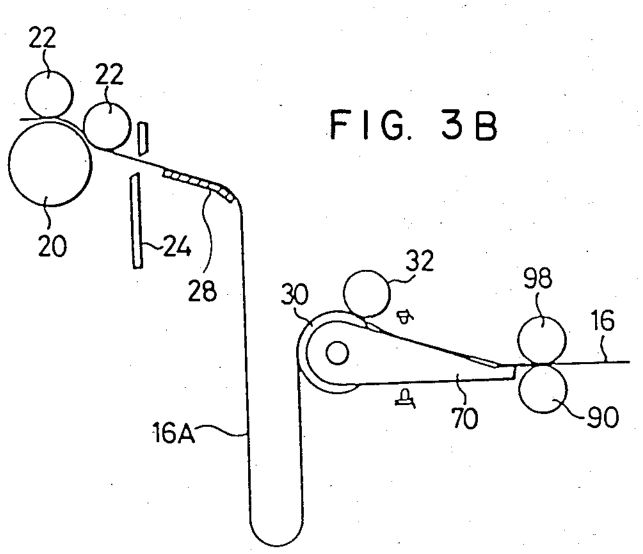
Figure 3C:
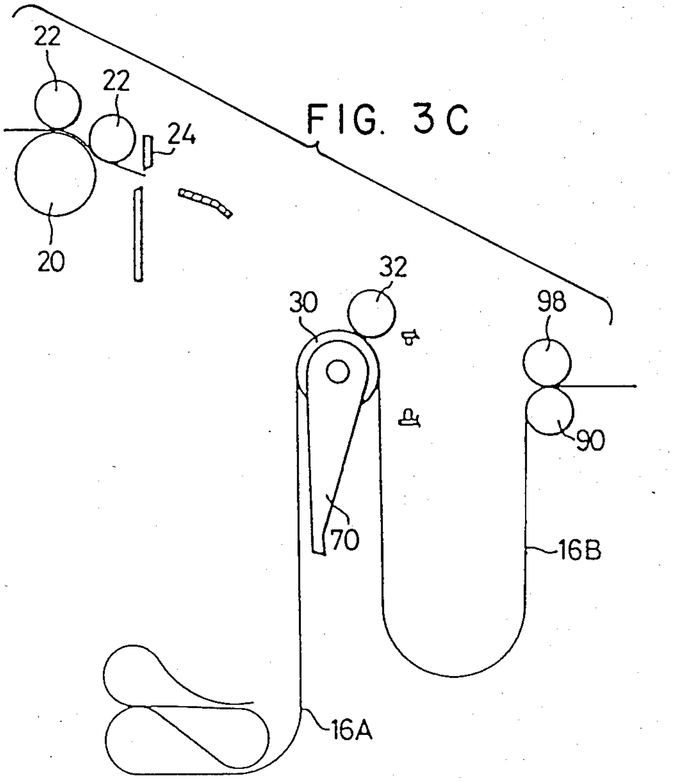

When the flap 70 lies between the second position and the vertically downward position, it is possible for a first loop 16A of the photographic paper 16 to be formed between the guide plate 28 and the first clamping and transporting roller 30 as shown in FIG. 3(B); when the flap 70 lies between the first portion and the vertically downward position, it is possible for a second loop 16B to be formed between the first and second clamping and transporting rollers 30 and 90 as shown in FIG. 3(C).

As shown in FIG. 1, the second clamping and transporting roller 90 is rotatably supported by the machine frame 18 through a bracket 96, and a second clamping and transporting roller 98 is disposed so as to abut against the roller 90. Accordingly, when the flap 70 reaches the second position as shown by the imaginary line in FIG. 1, the second clamping and transporting rollers 90 and 98 clamp the leading end portion of the photographic paper 16 guided by the flap 70 and feed it to the developing section 14 through a slit 100. For this purpose, the rotational force of a motor 102 is transmitted to the roller 90.

Guide plates 104 and 106 are respectively disposed at the first and second positions of the flap 70 in such a manner as to extend above and along the passing photographic paper 16, whereby the paper 16 is smoothly guided to the first clamping and transporting rollers 30 and 32 and to the second clamping and transporting rollers 90 and 98.

The following is a description of the operation of this embodiment.

Prior to the start of an exposure operation at the printing section 12, the flap 70 is disposed at the first position as shown by the solid line in FIGS. 1 and 3(A).

The leading end portion of the photographic paper 16 that has been exposed in the printing section 12 is fed out by the delivery rollers 20 and 22 to reach the guide plate 28. The leading end portion of the paper 16 is then projected out from the guide plate 28 and fed to the area between the first clamping and transporting rollers 30 and 32 while moving through the area between the flap 70 and the guide plate 104. When a slight amount of the leading end portion of the photographic paper 16 has been clamped between the first clamping and transporting rollers 30 and 32, the rotation of the motor 46 is suspended, and the movement of the leading end portion of the paper 16 is thereby stopped.

Then, the flap 70 is rotated counterclockwise as viewed in FIG. 1 so as to move to the second position, as shown in FIG. 3(B). At the same time, the operation of the motor 46 is resumed. Since the intermediate portion of the photographic paper 16 exposed at the printing section 12 is fed out therefrom at a relatively high feed rate, the first loop 16A is formed between the guide plate 28 and the first clamping and transporting roller 30.

At the same time, the leading end portion of the photographic paper 16 fed out from the area between the first clamping and transporting rollers 30 and 32 moves on the flap 70 so as to reach the area between the second clamping and transporting rollers 90 and 98 from which it is fed by the rotation of the motor 102 to the developing section 14 where the photographic paper 16 is successively developed.

When the leading end portion of the photographic paper 16 is fed out from the area between the second clamping and transporting rollers 90 and 98 by the rotation of the motor 102, the first clamping and transporting roller 32 is moved upwards by the rotation of the motor 62 so as to separate from the roller 30, so that the photographic paper 16 is fed to the developing section 14 by the force of the motor 102 alone.

When the exposure operation at the printing section 12 is to be temporarily suspended, the intermediate portion of the photographic paper 16 is cut by using the cutter 24. Even during the suspension of the exposure operation, the exposed photographic paper 16 is gradually fed to the developing section 14 at a relatively low feed rate, thereby allowing the developing operation to proceed.

Figure 3D:
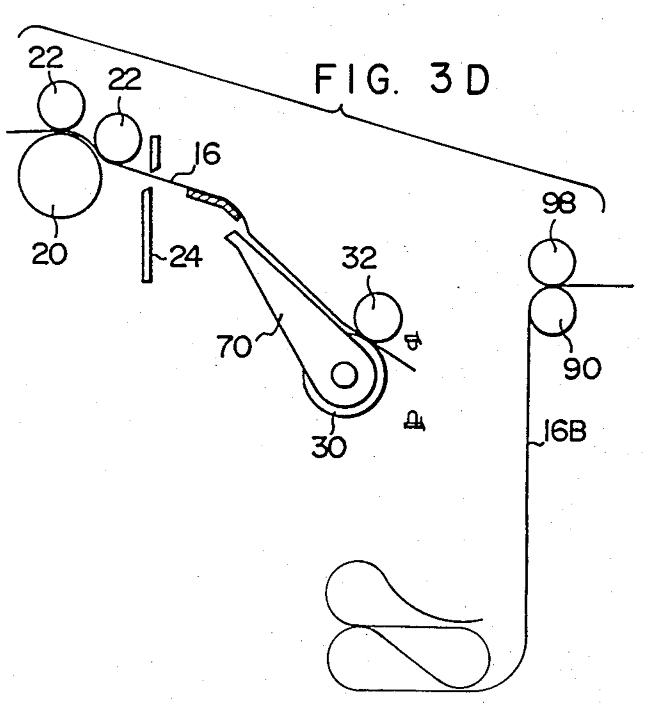
Figure 3E:
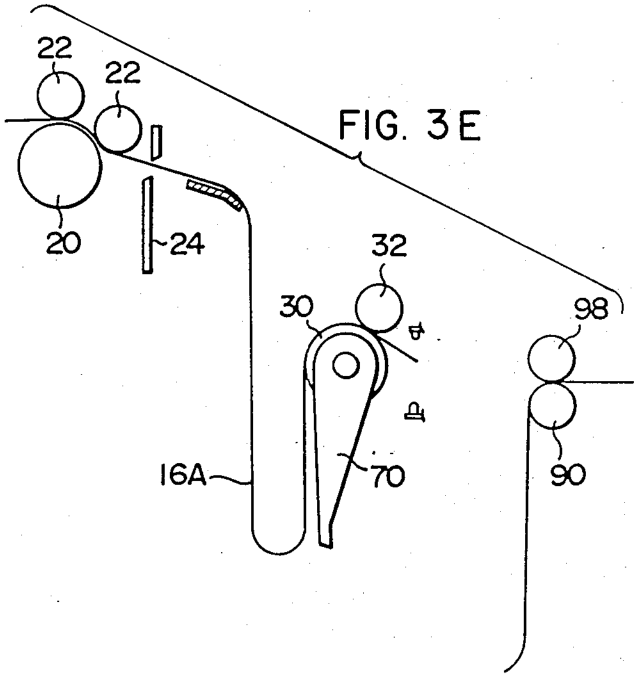

To resume the exposure operation at the printing section 12 in a state wherein the trailing end portion of the exposed photographic paper 16 remains in the form of the first loop 16A between the guide plate 28 and the first clamping and transporting roller 30, the flap 70 is moved from the second position to the vertically downward position by driving the motor 46, as shown in FIG. 3(C). Under this state, the first clamping and transporting roller 32 is brought into contact with the roller 30, and the roller 30 is rotated by driving the motor 46. In consequence, the photographic paper 16 in the form of the first loop 16A is moved so as to form the second loop 16B. As the motor 46 is further driven, the trailing end portion of the photographic paper 16 is suspended down from the second clamping and transporting roller 90, as shown in FIG. 3(D). At this time, the flap 70 is moved to the first position at which it prevents the formation of the first loop 16A, and the exposure operation at the printing section 12 is then resumed.

Thus, the leading end portion of the newly exposed photographic paper 16 is fed to the area between the first clamping and transporting rollers 30 and 32 while being guided by the flap 70. With the leading end portion of the paper 16 clamped between the rollers 30 and 32, the rotation of the roller 30 is suspended again, and the flap 70 is moved from the first position and stopped at, for example, the position at which it is suspended vertically downward. As the exposure operation at the printing section 12 proceeds, the exposed portion of the photographic paper 16 is successively accommodated in the apparatus 10 in the form of the first loop 16A.

Thus, even when the trailing end portion of the cut photographic paper 16 which has been exposed before the suspension of the exposure operation remains undeveloped in the apparatus 10, the leading end portion of the cut photographic paper 16 which is fed in after the resumption of the exposure operation can be accommodated in the first loop accommodating portion of the apparatus 10.

On the other hand, the conventional photographic paper accommodating apparatus can form only one loop of photographic paper and therefore disadvantageously needs two cutters in the front of and at the rear of the apparatus, respectively. In addition, when the loop of photographic paper formed before the suspension of the exposure operation remains in the apparatus at the time of the resumption of the operation, it is not possible to resume the exposure operation.

As has been described above, the photographic paper accommodating apparatus according to the present invention is provided with first and second photographic paper looping areas and a guide member which guides the leading end portion of a continuous photographic paper at these looping areas and which allows the paper to be looped in either the first or second looping area. It is therefore possible to reduce the number of required cutters and hence facilitate the handling of the apparatus. In addition, the present invention has the great advantage that it is possible to resume the exposure operation at the printing section at any time.

What is claimed is:

1. A photographic paper accommodating apparatus which is disposed on the downstream side of a photographic paper printing section for feeding an exposed continuous photographic paper to a subsequent step, said apparatus comprising:

(a) first clamping and transporting rollers disposed on the downstream side of said printing section so as to clamp and transport said photographic paper and define a first photographic paper looping area between said printing section and said rollers;

(b) second clamping and transporting rollers disposed on the downstream side of said first clamping and transporting rollers so as to clamp and transport said photographic paper and define a second photographic paper looping area between said first and second clamping and transporting rollers; and (c) a guide member movable between at least two, that is, first and second, positions, at which first position said guide member is disposed between said printing section and said first clamping and transporting rollers so as to guide the leading end portion of said photographic paper to said first clamping and transporting rollers, and at which second position said guide member is disposed between said first and second clamping and transporting rollers so as to guide the leading end portion of said photographic paper to said second clamping and transporting rollers.

2. A photographic paper accommodating apparatus according to claim 1, wherein said guide member is a pivotal flap which is movable between said first and second positions.

3. A photographic paper accommodating apparatus according to claim 2, wherein when said guide member is at a predetermined position between said first and second positions, the portion of said photographic paper accommodated in said first looping area can be moved to said second looping area by the rotation of said first clamping and transporting rollers.

4. A photographic paper accommodating apparatus according to claim 1, wherein said guide member is rotatably supported coaxially with either one of said first clamping and transporting rollers.

5. A photographic paper accommodating apparatus according to claim 4, wherein said guide member is rotatably supported by a shaft which supports either one of said first clamping and transporting rollers, through bearings respectively disposed on both sides of said roller.

6. A photographic paper accommodating apparatus according to claim 5, wherein said guide member is rotated by a driving gear meshed with a gear coaxially secured to said support shaft.

7. A photographic paper accommodating apparatus according to claim 1, wherein said second clamping and transporting rollers are able to come in and out of contact with each other and are separated from each other so as to cancel the photographic paper clamping force when the portion of said photographic paper in said first looping area is fed out to a developer in a subsequent step by the rotation of said second clamping and transporting rollers.

8. A photographic paper accommodating apparatus according to claim 1, wherein while the portion of said photographic paper in said second looping are is being fed to a developer in a subsequent step by the rotation of said second clamping and transporting rollers, the rotation of said first clamping and transporting rollers is suspended after the leading end of the following section of said photographic paper fed from said printing section has been clamped by said first clamping and transporting rollers.

9. A photographic paper accommodating apparatus according to claim 1, further comprising a photographic paper cutter disposed between said printing section and said first looping area.

10. A photographic paper accommodating apparatus according to claim 1, wherein said second clamping and transporting rollers are disposed below said first clamping and transporting rollers.

11. A photographic paper accommodating apparatus which is disposed between a photographic paper printing section and a developing section so as to accommodate the portion of a continuous photographic paper retained in accordance with a difference between the respective processing speeds at these sections, said apparatus comprising:

(a) a photographic paper cutter disposed on the downstream side of said printing section;

(b) first clamping and transporting rollers disposed on the downstream side of said cutter so as to clamp and transport said photographic paper and define a first photographic paper looping area between said cutter and said first clamping and transporting rollers;

(c) second clamping and transporting rollers disposed on the downstream side of said first clamping and transporting rollers so as to clamp and transport said photographic paper and define a second photographic paper looping area between said first and second clamping transporting rollers; and (d) a guide member movable between a first position at which it guides said photographic paper from said cutter to said first clamping and transporting rollers and a second position at which said guide member guides said photographic paper from said first clamping and transporting rollers to said second clamping and transporting rollers, said guide member allowing, at a predetermined position exclusive of said first and second positions, the portion of said photographic paper in said first looping area to be moved to said second looping area by the rotation of said first clamping and transporting rollers.

12. A photographic paper accommodating apparatus according to claim 11, wherein said guide member is a pivotal flap which is movable between said first and second positions.

13. A photographic paper accommodating apparatus according to claim 11, wherein said guide member is rotatably supported coaxially with either one of said first clamping and transporting rollers.

14. A photographic paper accommodating apparatus according to claim 13, wherein said guide member is rotatably supported by a shaft which supports either one of said first clamping and transporting rollers, through bearings respectively disposed on both sides of said roller.

15. A photographic paper accommodating apparatus according to claim 14, wherein said guide member is rotated by a driving gear meshed with a gear coaxially secured to said support shaft.

16. A photographic paper accommodating apparatus according to claim 11, wherein said second clamping and transporting rollers are able to come in and out of contact with each other and are separated from each other so as to cancel the photographic paper clamping force when the portion of said photographic paper in said first looping area is fed out to said developing section by the rotation of said second clamping and transporting rollers.

17. A photographic paper accommodating apparatus according to claim 11, wherein while the portion of said photographic paper in said second looping area is being fed to said developing section by the rotation of said second clamping and transporting rollers, the rotation of said first clamping and transporting rollers is suspended after the leading end of the following section of said photographic paper fed from said printing section has been clamped by said first clamping and transporting rollers.

18. A photographic paper accommodating apparatus according to claim 11, wherein said second clamping and transporting rollers are disposed below said first clamping and transporting rollers.

19. A photographic paper accommodating apparatus disposed between a printing section which feeds out a continuous photographic paper at a relatively high speed and a developing section which processes said photographic paper at a relatively low speed for absorbing the difference between these speeds, said apparatus comprising:

(a) a photographic paper cutter disposed on the downstream side of said printing section;

(b) first clamping and transporting rollers able to come in and out of contact with each other and disposed on the downstream side of said cutter so as to clamp and transport said photographic paper and define a first photographic paper looping area between said cutter and said first clamping and transporting rollers;

(c) second clamping and transporting rollers disposed on the downstream side of said first clamping and transporting rollers as to to clamp and transport said photographic paper and define a second photographic paper looping area between said first and second clamping and transporting rollers; and (d) a guide member rotatably supported coaxially with either one of said first clamping and transporting rollers and movable between a first position at which it guides said photographic paper from said cutter to said first clamping and transporting rollers and a second position at which said guide member guides said photographic paper from said first clamping and transporting rollers to said second clamping and transporting rollers, said guide member allowing, at a predetermined position exclusive of said first and second positions, the portion of said photographic paper in said first looping area to be moved to said second looping area by the rotation of said first clamping and transporting rollers.

20. A photographic paper accommodating apparatus according to claim 19, wherein said guide member is rotatably supported by a shaft which supports either one of said first clamping and transporting rollers, through bearings respectively disposed on both sides of said roller.

21. A photographic paper accommodating apparatus according to claim 19, wherein while the portion of said photographic paper in said second looping area is being fed to said developing section by the rotation of said second clamping and transporting rollers, the rotation of said first clamping and transporting rollers is suspended after the leading end of the following section of said photographic paper fed from said printing section has been clamped by said first clamping and transporting rollers.

22. A photographic paper accommodating apparatus according to claim 19, wherein said second clamping and transporting rollers are disposed below said first clamping and transporting rollers.

* * * * *